United States Patent [19]

Howse

[11] Patent Number: 4,644,809
[45] Date of Patent: Feb. 24, 1987

[54] DRIVE MECHANISM

[75] Inventor: Geoffrey P. Howse, Reading, England

[73] Assignee: Aquatech Marketing Limited, Newbury, England

[21] Appl. No.: 789,305

[22] PCT Filed: Feb. 14, 1985

[86] PCT No.: PCT/GB85/00057

§ 371 Date: Oct. 11, 1985

§ 102(e) Date: Oct. 11, 1985

[87] PCT Pub. No.: WO85/03752

PCT Pub. Date: Aug. 29, 1985

[30] Foreign Application Priority Data

Feb. 14, 1984 [GB] United Kingdom ............... 8403843

[51] Int. Cl.$^4$ .................... F16H 21/16; F16H 25/16
[52] U.S. Cl. .......................................... 74/25; 74/70; 74/435; 74/665 GA; 74/812
[58] Field of Search ............... 74/435, 25, 70, 665 F, 74/665 G, 665 GA, 812, 126, 88

[56] References Cited

U.S. PATENT DOCUMENTS

| 778,855 | 1/1905 | Goldmann | 74/134 X |
| 2,751,028 | 6/1956 | Laughlin | 74/202 X |
| 3,010,336 | 11/1961 | Adair et al. | 74/435 X |
| 3,101,558 | 8/1963 | Young | 74/665 GA X |
| 3,528,309 | 9/1970 | Laybourn | 74/812 X |
| 3,890,853 | 6/1975 | Foltz | 74/435 |
| 4,229,982 | 10/1980 | Cattorini et al. | 74/435 X |
| 4,572,027 | 2/1986 | Lusk | 74/812 |

FOREIGN PATENT DOCUMENTS

| 2613181 | 10/1977 | Fed. Rep. of Germany . |
| 711436 | 9/1931 | France . |
| 972281 | 10/1964 | United Kingdom . |

Primary Examiner—Leslie Braun
Assistant Examiner—Dwight G. Diehl
Attorney, Agent, or Firm—Griffin, Branigan & Butler

[57] ABSTRACT

A drive mechanism for transmitting bidirectional drive to two or more rotary actuator spindles having a disc driven by an input shaft. Each spindle carries a spur gear which engages alternately with inner and outer tooth sections formed at different positions around a respective track in the disc. To accommodate several gears, tracks are provided at two different radii and three tracks of different width are nested together. The spur gears and tooth sections can be replaced by cams and tracks or shaped levers and pegs. The disc can be moulded and enables standard valves to be used in a complex operational sequence.

9 Claims, 7 Drawing Figures

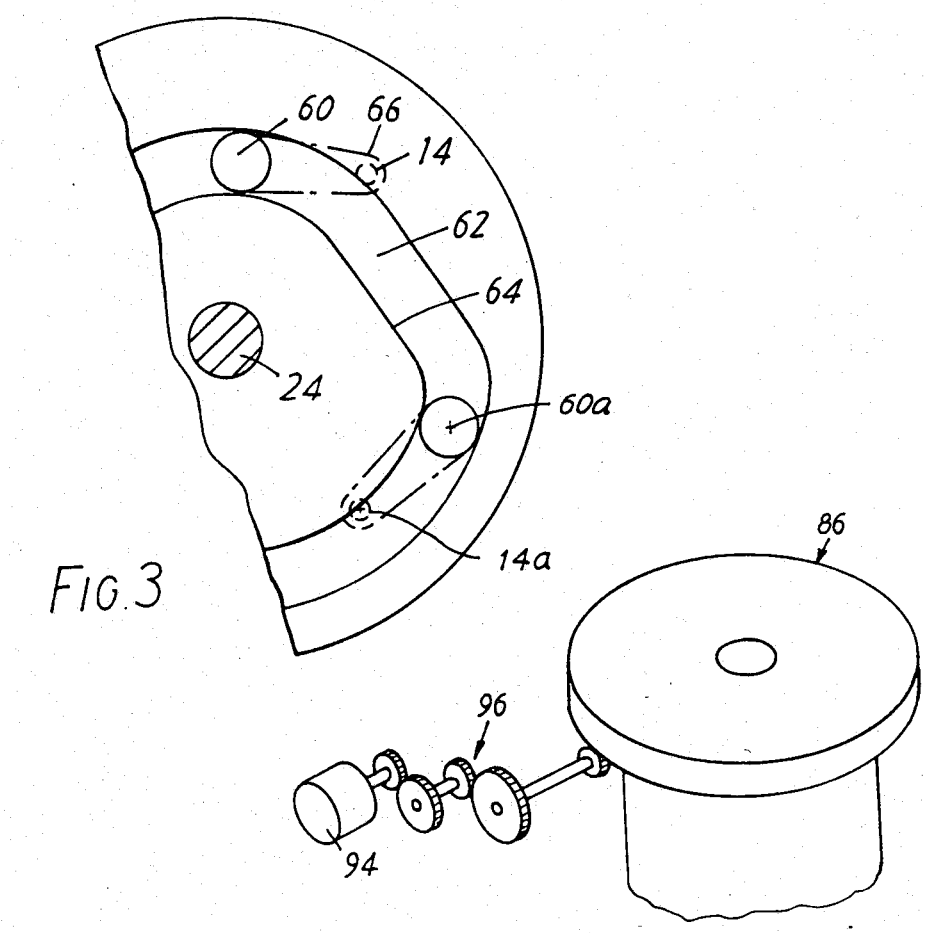
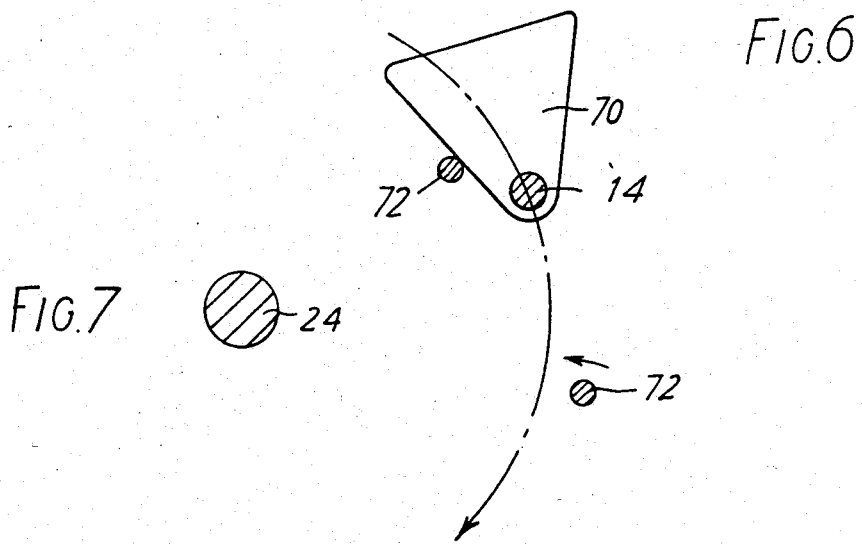

DRIVE MECHANISM

This invention relates to a drive mechanism for transmitting programmed bidirectional drive to two or more rotary actuators, and in particular to such a mechanism which is suitable for controlling a plurality of fluid flow control valves in sequence.

Various requirements exist for controlling a plurality of rotary valves in a predetermined sequence, for example in backwashing a filter, or regenerating a water softener or an ion exchange system. Hitherto in conventional automatically operated systems a complex valve structure has been required which is difficult and expensive to make, or alternatively several solenoid-operated valves have been necessary. A need, therefore, exists for an inexpensive but effective system for driving several fluid flow control valves in a desired sequence.

Other examples exist of a more general problem where it is required to operate several rotary elements in a predetermined sequence.

The present invention is defined in the appended claims to which reference should not be made.

The invention will be described in more detail, by way of example, with reference to the drawings, in which:

FIG. 3 is a schematically shown detail in plan of a modified embodiment using a cam follower and cam track;

Figure 4:
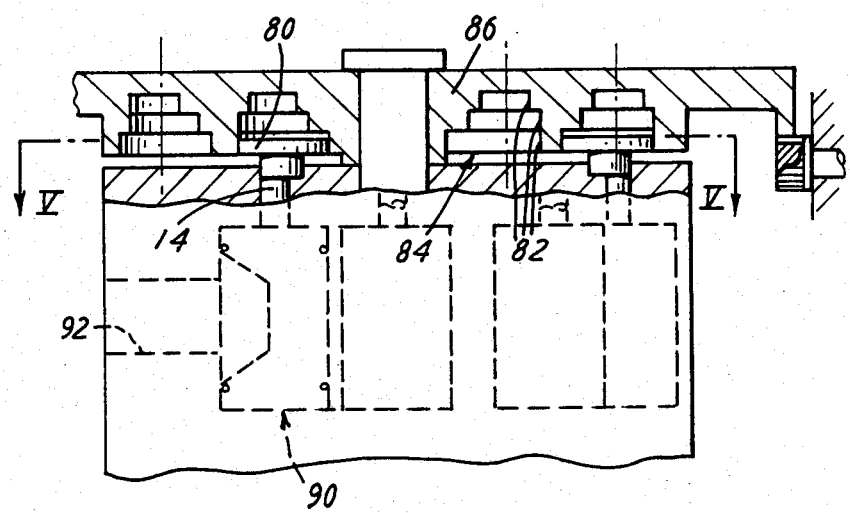
FIG. 4 is a schematically shown side sectional plan view of a further modification using a cam follower and cam track taken on the line IV—IV in FIG. 5.

FIG. 6 diagrammatically illustrates the motor drive to the drive wheel of the modification of FIG. 4; and FIG. 7 is a schematically shown detail in plan of another modified embodiment using a lever and pegs.

Figure 1:
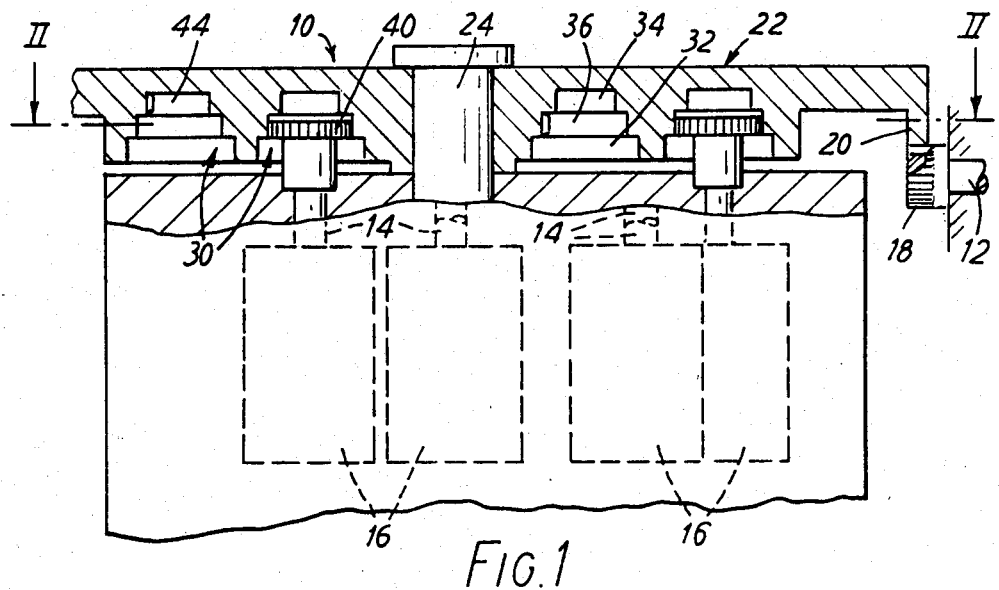
FIG. 1 is a side sectional view through one drive mechanism embodying the invention and employing a tooth drive.
Figure 2:
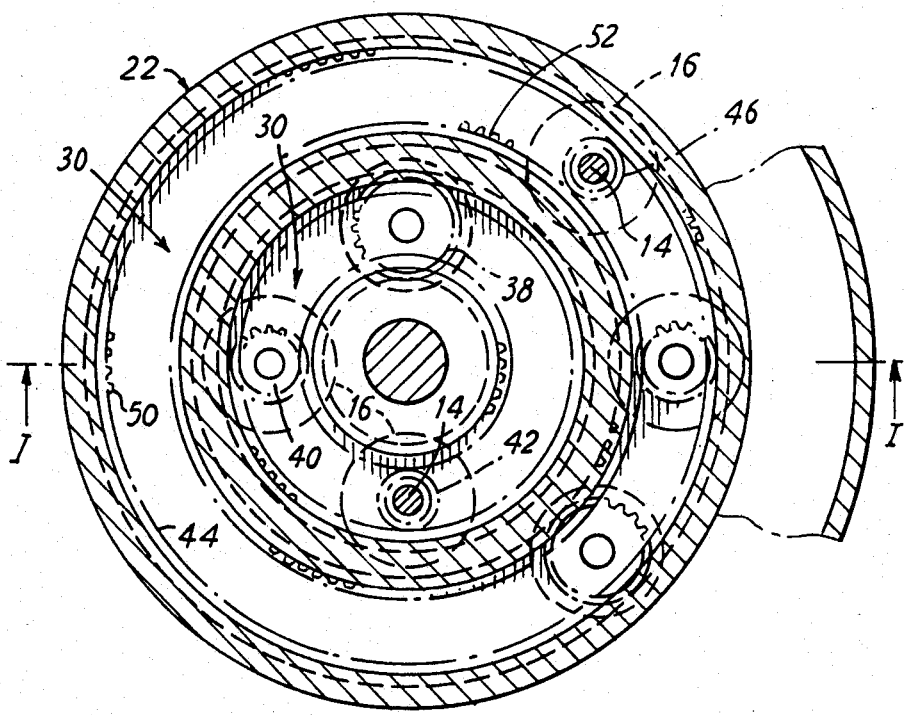
FIG. 2 is a plan view taken on the line II—II in FIG. 1.

The drive mechanism 10 shown in FIGS. 1 and 2 is designed to transmit drive from an input shaft 12 which rotates in one direction only to a plurality of rotary actuators, which are in this instance the spindles 14 of conventional and readily available liquid flow control valves 16, such as might be found on the water inlet to a conventional domestic washing machine or similar appliance. The valves 16 are required to be opened and closed in a predetermined sequence. In the example illustrated there are six such valves and they are used to control the operation of a water softener or water conditioner which requires periodically a sequence of operations involving backwashing, brining, rinsing, and refilling etc.

The input shaft 12 rotates a spur gear 18 which engages teeth on the peripheral lip 20 of a rotatable disc 22, mounted for rotation by any suitable central support 24. The disc 22 and the spindles 14 all rotate about parallel axes. The disc 22 is moulded from a suitable plastics material. On the underside of the disc 22, as seen in FIG. 1, are two circular channels 30 of different radii. The spindles 14 of three of the valves 16 lie on the centre line of the inner channel and the spindles of the other three valves lie on the centre line of the outer channel, as seen in FIG. 2.

Each channel 30 is stepped as seen in section (FIG. 1) so that the lowermost one-third of the channel forms a relatively wide track 32, the uppermost third forms a relatively narrow track 34, and the middle third forms a track 36 of intermediate width. Each spindle 14 carries a spur gear, and the spur gears associated with each channel are of differing diameters so as to fit in the respective one of the tracks. Thus, in the inner channel, spur gear 38 fits in track 32, spur gear 40 fits in track 36, and spur gear 42 fits in track 34. It is thus seen that more than one output member can be associated with a given channel by providing a plurality of tracks on different radial planes within the channel. At the same time two output members are associated with a given radial plane by the provision of two channels at different radii.

Each track has tooth sections on its inner and outer faces at selected positions around the disc. The outer tooth sections thus face inwardly and the inner tooth sections face outwardly, and the inner and outer tooth sections are on different radii. The inner and outer tooth sections associated with each track occupy different radial sectors so that the associated spur gear engages selectively with one or other of the tooth sections as the disc rotates. The gear cannot be simultaneously engaged by both, but there may be large sectors where it is engaged by neither. It will be appreciated that engagement of the spur gear by the inner and outer tooth sections will cause the spur gear to rotate in opposite directions, that is to say engagement by the outer tooth section will cause the spur gear to rotate in the same direction as the disc while engagement by the inner tooth section will cause the spur gear to rotate in the opposite direction to the disc. Thus by providing alternately around the track inner and then outer tooth sections, the spur gear, and hence the spindle 14, can be pivoted alternately in one direction and then the other, thus opening and then closing the valve 16. Each valve can be controlled independently by the provision of appropriate tooth sections in its associated track.

Referring to FIG. 2, the uppermost track 44 of the outer channel is seen to have an outer tooth section 50 and an inner tooth section 52. These should have the same number of teeth so that the associated spur gear 46 undergoes no net rotation after one complete revolution of the disc 22. To achieve the same degree of rotation, tracks of greater width will require a greater number of teeth, in proportion to the number of teeth on the spur gear.

The mechanism shown in FIGS. 1 and 2 has the advantages of being relatively cheap to manufacture while allowing the complex sequencing of a number of valves. The disc can readily be moulded to provide the desired valve operation sequence. By using such a mechanism it becomes possible to use standard valves to control the flow without the need to make an expensive valve unit of complicated construction.

Modifications of the mechanism are shown in FIGS. 3, 4 to 6 and 7. In respects other than those indicated, these mechanisms are similar to that of FIGS. 1 and 2.

FIG. 3 shows an arrangement in which the spur gear and tooth sections are replaced by a disc-shaped cam follower 60 and track 62. The cam follower is mounted on the spindle 14 by a bell crank 66, so that the centre 60a of the cam follower is offset from the axis 14a of the spindle. The track moves radially inwardly and outwardly as the disc rotates, so that side edges 64 of the track engage the cam follower 60 to rotate the valve spindle 14.

Figure 5:
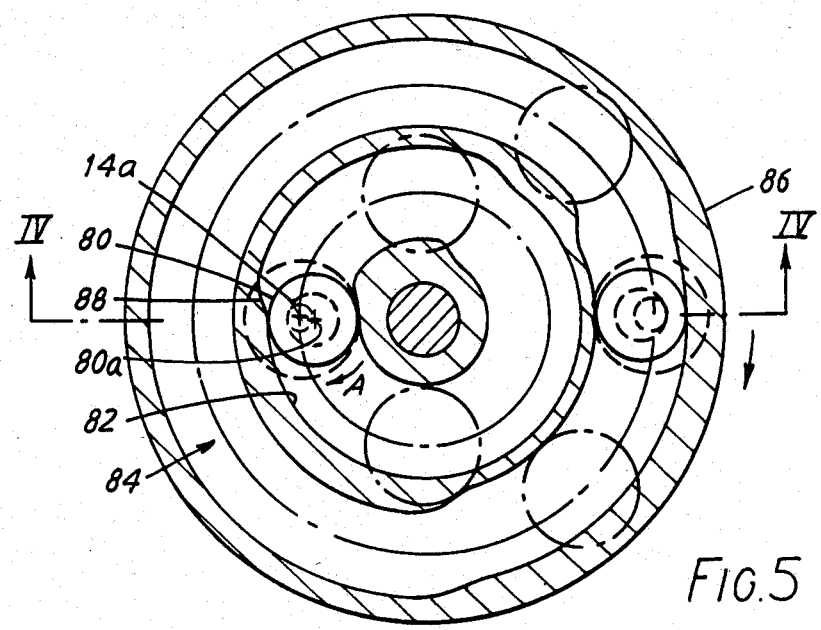
FIG. 5 is a schematic sectional plan view through the mechanism of FIG. 4 taken on the line V—V.

In the modification of FIGS. 4 to 6, disc-shaped cam followers 80 are eccentrically mounted directly on the spindles 14. (The centre of the cam follower is shown at 80a and that of the spindle at 14a in FIG. 5). Each cam follower bears on the sides 82 of a respective cam track 84 in the drive wheel 86, and the cam tracks are nested, as with the embodiments of FIGS. 1 and 2, as shown in FIG. 4. That is to say, three tracks of successively decreasing width are arranged at deeper heights into the thickness of the drive wheel on the same pitch circle diameter. Two channels are formed at different radii, each comprising three tracks, as in the embodiment of FIG. 1. Where the spindle 14 is to be rotated, the track 84 steps from one radius to another on the drive wheel 86, as shown at 88 on FIG. 5. When this occurs with the drive wheel 86 rotating clockwise as seen in FIG. 5, the cam follower 80 swings as indicated by the arrow A in FIG. 5. Some 90 degrees of rotation of the spindle can be obtained with this arrangement. At at least one point or sector around the track 84 the cam follower 80 will be engaged by the outer edge of the track to swing the spindle 14 in one pivotal direction, and at at least one other point or sector around the track the cam follower will be engaged by the inner edge of the track to swing the spindle in the other direction. It is only these engaged portions of the track that are essential to cause the pivoting function. FIG. 4 diagrammatically shows a rotary valve 90 capable of shutting off water flow in a passage 92, in response to rotation of spindle 14 caused by cam follower 80. As shown diagrammatically in FIG. 6, the drive wheel 86 may be driven by a motor 94 through a reduction gear train 96.

In FIG. 7, the spur gear is replaced by a triangular lever 70 which is engaged by pegs 72 on the disc 22. In all these modifications the engageable members mounted on the spindles 14 are engaged on both sides by engagement means (64;72;88) at different radii to produce a predetermined reciprocatory pivotal movement.

One advantage of the independence of the operation of the valves by the individual tracks is that they can be arranged so that the force required from the motor is not excessive at any point, this being achieved by slightly staggering the valve operations so that they do not all occur at precisely the same rotary position of the drive wheel 86.

What is claimed is:

1. A drive mechanism for transmitting bidirectional drive to two or more rotary actuators, comprising a rotatable input member, drive transmitting means coupled to the input member and rotatable about an axis, and two or more output members coupled to respective rotary actuators and rotatable about substantially parallel axes, the drive transmitting means having a plurality of drive tracks each with first and second engagement formations occupying different sectors around the track, and the output members carrying driven members having engageable formations engageable alternately on opposed sides by the first and second engagement formations respectively of respective ones of the drive tracks to cause reciprocatory pivotal movement of the output members in selectively controlled manner for each of the output members respectively.

2. A drive mechanism according to claim 1, in which the engagement formations are provided by the opposed sides of the track, and each engageable formation comprises a cam follower slideable in the track.

3. A drive mechanism according to claim 2, in which each engageable formation comprises a circular disc mounted eccentrically with respect to the associated output member.

4. A drive mechanism according to claim 1, in which each engageable formation comprises a spur gear, and each engagement formation comprises a tooth section facing into the track.

5. A drive mechanism according to claim 4, including a plurality of drive tracks on different radial planes and nested with respect to one another such that at least one narrower track is accessible through a wider track.

6. A drive mechanism according to claim 4, including a plurality of drive tracks at different radial pitches on the drive transmitting means.

7. A drive mechanism according to claim 1, in which the engagement formations are provided by abutments, and the engageable formations are provided on a shaped lever.

8. A drive mechanism according to claim 1, in which the drive transmitting means is constituted by a moulded disc.

9. A drive mechanism for transmitting bi-directional drive to a plurality of rotary actuators, said mechanism comprising:
   a rotatable input member;
   drive transmitting means coupled to said input member and rotatable about an axis, and a plurality of output members coupled to respective rotary actuators and rotatable about substantially parallel axes;
   said drive transmitting means having a plurality of drive tracks each with first and second engagement formations comprising toothed sections facing into a track and occupying different sections around such track;
   said drive tracks being on different radial planes and of different widths and being in overlapping, stepped arrangement with respect to one another so that each track is accessible through a next-outermost, wider track; and,
   said output members carrying driven members having engageable formations, each comprising a spur gear section, engageable alternatively on opposed sides of the output member by said first and second engagement formations respectively of a different one of said drive tracks to cause reciprocatory, pivotal movement of each of the output members in a selectively controlled manner.

* * * * *